US011171845B2

(12) United States Patent
Papacica et al.

(10) Patent No.: US 11,171,845 B2
(45) Date of Patent: Nov. 9, 2021

(54) QOS-OPTIMIZED SELECTION OF A CLOUD MICROSERVICES PROVIDER

(71) Applicant: INTERNATIONAL BUSINESS MACHINES CORPORATION, Armonk, NY (US)

(72) Inventors: Adrian Papacica, Carmel, CA (US); Todd Weston Arnold, Charlotte, NC (US); Barry Michael Graham, Silver Spring, MD (US); Shenbaga Shankar, Pearland, TX (US); Alexandra Urman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/733,400

(22) Filed: Jan. 3, 2020

(65) Prior Publication Data

US 2021/0211363 A1 Jul. 8, 2021

(51) Int. Cl.
*H04L 12/24* (2006.01)
*H04L 29/08* (2006.01)

(52) U.S. Cl.
CPC ...... *H04L 41/5058* (2013.01); *H04L 41/5041* (2013.01); *H04L 67/10* (2013.01); *H04L 41/5009* (2013.01)

(58) Field of Classification Search
CPC ............ H04L 41/5009; H04L 41/5041; H04L 41/5058; H04L 67/10
See application file for complete search history.

(56) References Cited

U.S. PATENT DOCUMENTS

2015/0348065 A1* 12/2015 Doganata ........... G06Q 30/0202 705/7.31
2015/0363851 A1* 12/2015 Stella ...................... H04L 67/14 705/26.41

(Continued)

FOREIGN PATENT DOCUMENTS

CN 108833161 A 11/2018

OTHER PUBLICATIONS

Anonymous; Serverless Computing Broker; IP.com; IPCOM000258229D; Apr. 20, 2019; 2 pages.

(Continued)

*Primary Examiner* — Gil H. Lee
(74) *Attorney, Agent, or Firm* — Schmeiser, Olsen & Watts; Aaron Pontikos

(57) ABSTRACT

A microservices-management system intercepts a request for a cloud-based microservice sent by a microservices-architecture application. The system selects an optimal cloud-service provider from a group of candidate providers capable of delivering the microservice and then forwards the request to the optimal provider. The optimal provider is selected by drawing cognitive inferences from stored blockchain records that each describe a characteristic of a previous delivery of the requested service. Each record is generated by one of the candidate providers when delivering an instance of the microservice, regardless of whether the provider is in a trusted relationship with the application owner. The providers are barred by blockchain's intrinsic security features from altering or deleting previously stored blockchain records. Upon delivery of the service, the system compares the actual quality or cost of the delivery with predicted values in order to learn how to more effectively select optimal providers.

20 Claims, 8 Drawing Sheets

(56) References Cited

U.S. PATENT DOCUMENTS

| | | | | |
|---|---|---|---|---|
| 2018/0367632 | A1* | 12/2018 | Oh | H04L 67/2809 |
| 2019/0102850 | A1 | 4/2019 | Wheeler | |
| 2020/0089515 | A1* | 3/2020 | Hari | H04L 41/0813 |
| 2020/0119906 | A1* | 4/2020 | Das | H04L 9/3239 |

OTHER PUBLICATIONS

Bhamare, Deval et al.; Multi-Objective Scheduling of Micro-Services for Optimal Service Function Chains; 2017 IEEE International Conference on Communications; May 21-25, 2017; 6 pages.
Brogi A. et al.; Optimising QoS-Assurance, Resource Usage and Cost of Fog Application Deployments; Cloud Computing and Services Science; CLOSER 2018; Communications in Computerand Information Science; vol. 1073; 6 pages.
Choosing a Microservices Deployment Strategy; https://www.nginx.com/blog/deploying-microservices/; retrieved from the Internet Mar. 29, 2019; 4 pages.
Composite Application Manager for SOA, Version 7.1.1; https://www.ibm.com/support/knowledgecenter/en/SS3JRN_7.2.0/com.ibm.itcamsoa.doc/kd4ugmst20.htm; retrieved from the Internet Mar. 29, 2019; 4 pages.
Handy, Alex; What Blockchain Looks Like in Microservices; May 28, 2018; https://thenewstack.io/what-blockchain-looks-like-in-microservices/; 10 pages.
Monitor and Scale Your Microservices; https://www.datadoghq.com/dg/apm/microservices/?utm_source=Advertisement&utm_medium=GoogleAdsAPM&utm_campaign=GoogleAdsAPM-Microservices&utm_content=Microservices&utm_keyword=%2Bmicroservices%20%2Bperformance&utm_matchtype=b&gclid=Cj0KCQiAp7DiBRDdARIsABIMfoDB0sJv6xZqCtGIK7ZmcVFMkmGvqNQ09TmX23rRreRKRJBQdNvO6GEaAn--EALw_wcB; retrieved from the Internet Mar. 29, 2019; 2 pages.
Richardson, Chris; Microservice Architecture; https://microservices.io/articles/deployment.html; retrieved from the Internet Mar. 29, 2019; 5 pages.
Samaniego, Mayra, et al., "Using Blockchain to Push Software-Defined IoT Components onto Edge Hosts," Proceedings of the International Conference on Big Data and Advanced Wireless Technologies (BDAW '16), ACM, 2016, 9 pages.
Sousa, Gustavo et al.; Automated Setup of Multi-Cloud Environments for Microservices Applications; IEEE 9th International Conference on Cloud Computing; Jun. 2016; pp. 327-334.
Stevant, Bruno et al.; Optimizing the Performance of a Microservice-Based Application Deployed on User-Provided Devices; 17th International Symposium on Parallel and Distributed Computing; Jun. 2018; pp. 133-140.
Mell, Peter et al.; "The NIST Definition of Cloud Computing;" National Institute of Standards and Technology; Special Publication 800-145; Sep. 2011; 7 pages.

* cited by examiner

QOS-OPTIMIZED SELECTION OF A CLOUD MICROSERVICES PROVIDER

BACKGROUND

The present invention relates in general to microservice-based applications and in particular to ensuring quality of service (QoS) of an application that comprises cloud-based microservices.

Quality of service (QoS) refers to any description or measurement of the overall performance of a service, such as a cloud-hosted service, a telephony service, or a computer-networking service. QoS is sometimes used to describe characteristics of the delivery of a service that are seen by users.

Unlike conventional monolithic software applications, an application based on a microservices architecture is a loosely coupled collection of finely grained services that communicate with each other through service-agnostic, lightweight protocols. These services may have been developed and implemented in different languages by different organizations and may even run on different platforms.

Unlike more robust services comprised by architectures like a service-oriented architecture (SOA) or software layers that make up a hierarchical protocol stack, each microservice performs a single narrowly defined operation. This fine granularity and loose coupling allows multiple microservices applications to share third-party microservices that perform common operations and allows a developer to scale the functionality of each microservice used by a microservices application independently of other microservices used by the same application.

A microservices application may require a cloud-based microservice that is available as a hosted service from one or more cloud service providers. In some cases, such a cloud-based microservices may in turn call other cloud-based services hosted by yet other cloud service providers. The overall quality of service (QoS) provided by a microservices application is thus a function of the QoS provided by the service providers that deliver microservices required by the application.

SUMMARY

Embodiments of the present invention comprise systems, methods, and computer program products for QoS-optimized selection of cloud microservices providers. A microservices-management system detects that a microservices-architecture application has requested delivery of a cloud-based microservice. The system selects an optimal cloud-service provider from a group of candidate providers capable of delivering the microservice and then forwards the request to the optimal provider. The optimal provider is selected by an artificially intelligent, self-learning cognitive selector module that draws inferences from stored blockchain records and extrinsic or contextual data. The blockchain records, each of which describe a cost or QoS characteristic of a previous delivery of the requested service, are each stored by one of the candidate providers when delivering an instance of the microservice, regardless of whether the provider is in a trusted relationship with the application owner. The providers are barred by blockchain's intrinsic security features from altering or deleting previously stored blockchain records. Upon delivery of the service, the system compares the actual quality or cost of the delivery with predicted values derived from the inferences. This comparison allows the self-learning cognitive selector module to learn how to more effectively select optimal providers in the future.

DETAILED DESCRIPTION

Figure 1:
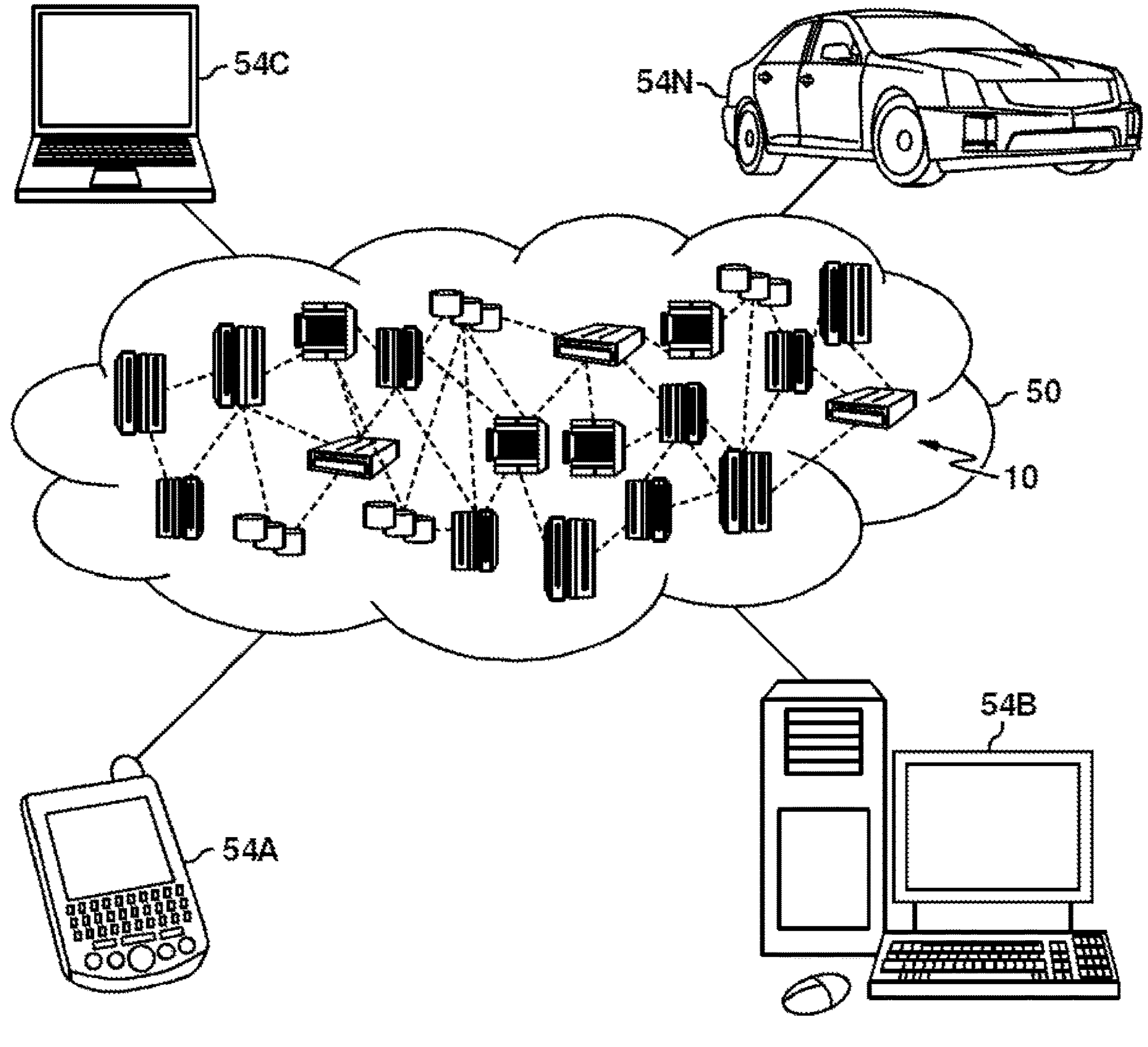
FIG. 1 depicts a cloud computing environment according to an embodiment of the present invention.

The cost, availability, or response time of a microservices application that incorporates cloud-based microservices can be affected by fluctuations in a cloud's quality-of-service (QoS) or by changes in a cloud provider's contractual terms. These effects can be especially unpredictable when a cloud-based microservice requires microservices hosted by other clouds. Current cloud-management applications thus cannot predict the cost or other QoS-related parameter of a microservices application that comprises cloud-based microservices or compare the actual behavior of such an application against contractually obligated levels of service.

Embodiments of the present invention address this problem by using blockchain technology to enhance existing microservices applications, distributed computing environments, and microservices-management systems. Unlike current technologies, these enhanced applications, computing environments, and systems are able to transparently monitor the QoS of microservices applications that comprise cloud-based microservices.

Blockchain provides a unique combination of features that allow such enhanced systems to store information describing the QoS of services provided by independent cloud providers in a secure, distributed ledger that is not under the control of any single, centralized entity. Blockchain's decentralized data store facilitates the collection and access of records in a distributed network environment like the Internet or a multi-site intranet. Because the blockchain data structure bars modifications to previously stored records, untrusted cloud providers cannot change tracked QoS data stored in a blockchain-based log or change the order in which tracked data is stored. Similarly, if each participating cloud-service provider is designated to be a blockchain node, new data can be added to a corresponding blockchain only if a consensus exists among multiple nodes. These features ensure the security, availability, and accuracy of QoS data captured from multiple cloud-computing environments, even if those environments are hosted by even untrusted service providers.

Blockchain also provides real-time performance in a decentralized networked environment, allowing cognitive, self-learning, and artificially intelligent embodiments to continuously monitor an application's or a microservice's QoS. This allows such embodiments to continuously refine their ability to predict which cloud provider is most likely to provide optimal service quality.

Embodiments of the present invention use blockchain and artificially intelligent technologies to improve current microservices technology by: monitoring the quality of service of each candidate provider of an application's microservice; storing the monitored QoS data into a blockchain-based log data structure; responding into an application's request for a cloud-based microservice by intelligently drawing inferences from current and previously logged QoS data; and using those inferences to select the best cloud service provider for the requested microservice.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
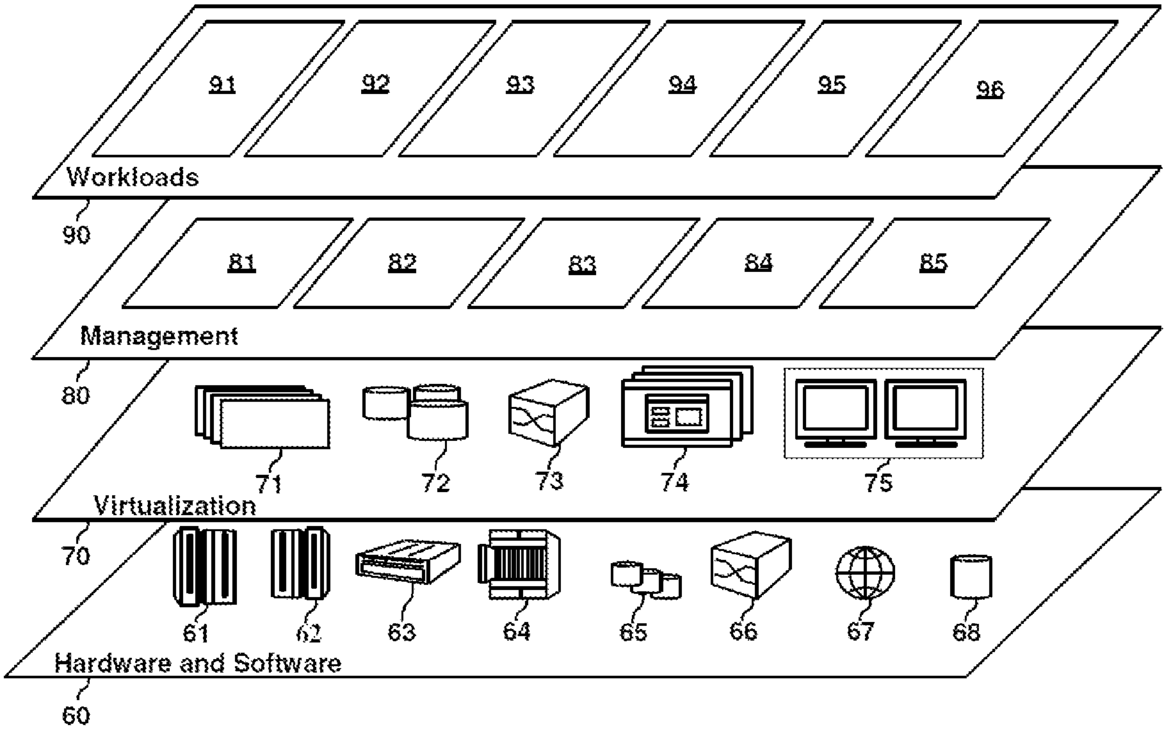
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of systems and methods for QoS-optimized selection of a cloud microservices provider.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
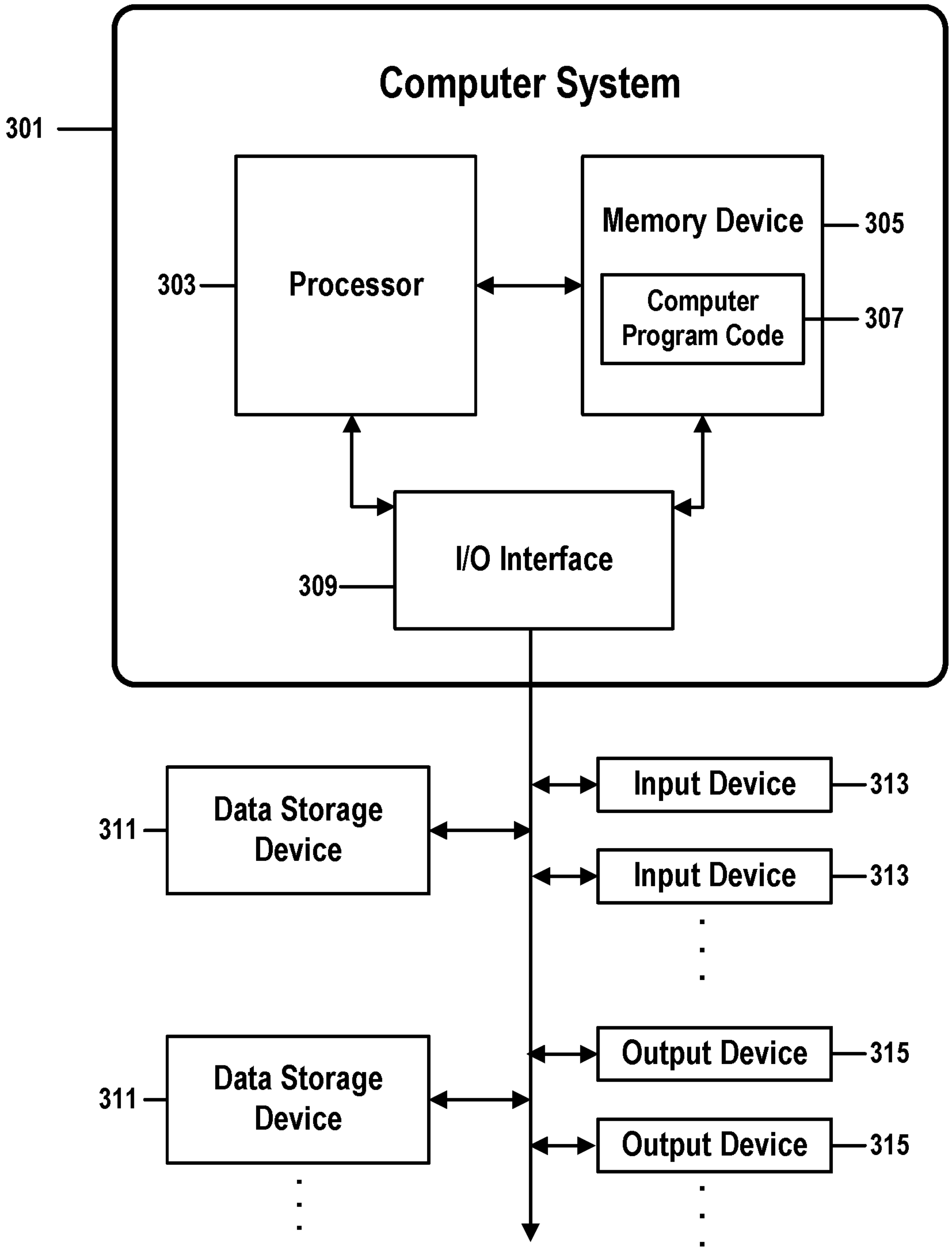
FIG. 3 shows the structure of a computer system and computer program code that may be used to implement a method for QoS-optimized selection of cloud microservices providers in accordance with embodiments of the present invention.

FIG. 3 shows a structure of a computer system and computer program code that may be used to implement a method for QoS-optimized selection of cloud microservices providers in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for QoS-optimized selection of cloud microservices providers in accordance with embodiments of the present invention, and may implement other embodiments described in this specification, including the methods illustrated in FIGS. 1-8. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for QoS-optimized selection of cloud microservices providers.

Any of the components of the present invention could be created, integrated, hosted, maintained, deployed, managed, serviced, supported, etc. by a service provider who offers to facilitate a method for QoS-optimized selection of cloud microservices providers. Thus the present invention discloses a process for deploying or integrating computing infrastructure, comprising integrating computer-readable code into the computer system 301, wherein the code in combination with the computer system 301 is capable of performing a method for QoS-optimized selection of cloud microservices providers.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for QoS-optimized selection of cloud microservices providers may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for QoS-optimized selection of cloud microservices providers is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
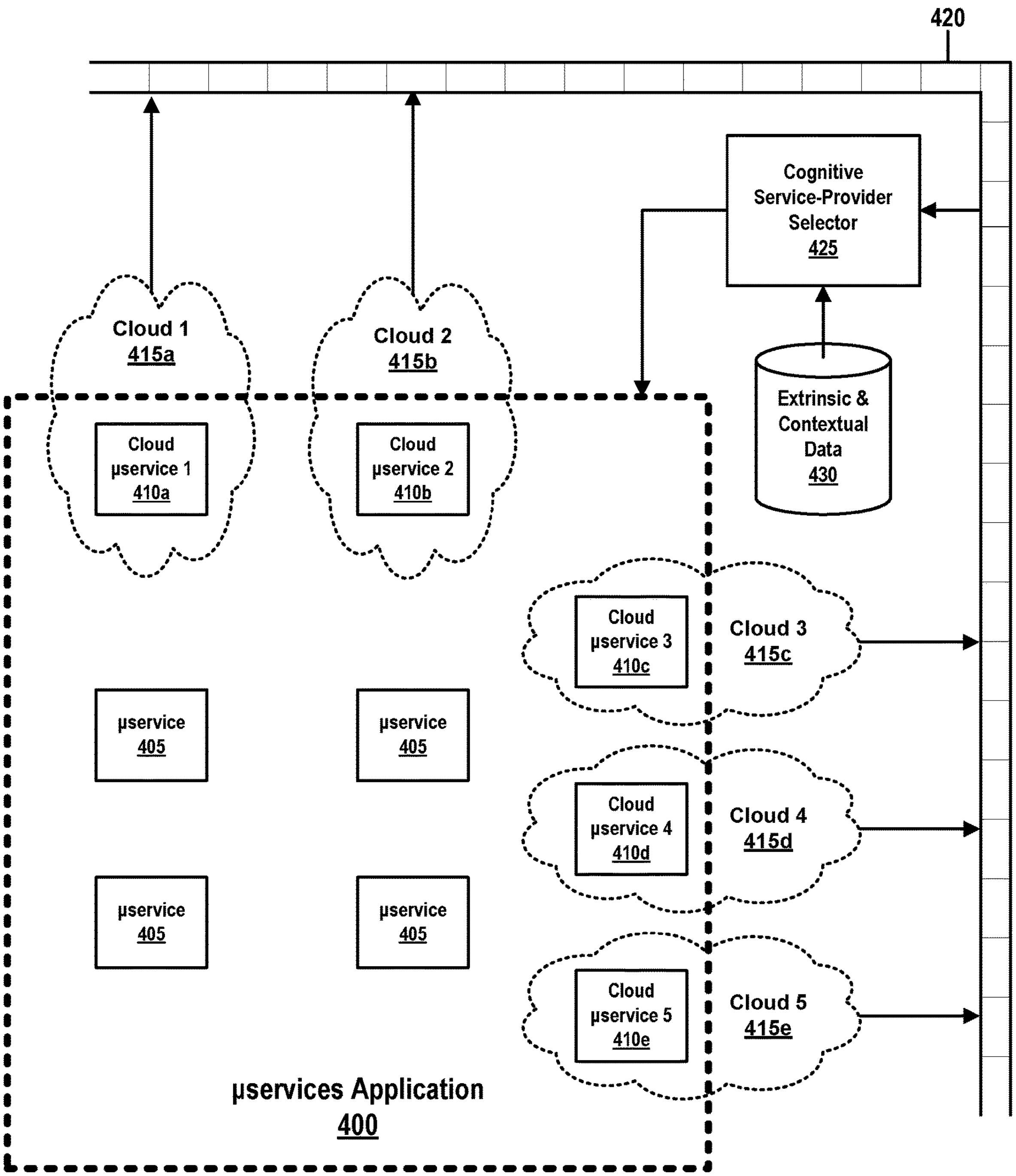
FIG. 4 shows a topology of a system that implements a method for QoS-optimized selection of cloud microservices providers in accordance with embodiments of the present invention.

FIG. 4 shows a topology of a system that implements a method for QoS-optimized selection of cloud microservices providers in accordance with embodiments of the present invention. FIG. 4 shows items 400-430.

Microservices application 400 is based on a microservice architecture that provides each finely grained subfunction of application 400's functionality by requesting a microservice 405 or 410*a*-410*e*. In FIG. 4, at last some of these microservices are cloud-based microservices 410*a*-410*e* that are delivered upon demand to application 400 as a hosted service of a cloud service provider's cloud-computing environment 415*a*-415*c*.

In some embodiments, all microservices required by application 400 may be cloud-based microservices 410*a*-410*e* and it is possible for a multiple instances of a particular cloud microservice 410*a*-410*e* to be available to application 400, each of which is hosted by a different cloud service provider. Because cloud providers may deliver the same microservice at different costs and may offer different qualities of service, one benefit of the present invention is its ability to automatically direct a microservice request to the service provider most likely to deliver the microservice at the lowest cost or with the best performance.

As explained in the BACKGROUND, and as is known in the art, a microservices architecture is distinct from other types of modular, non-monolithic, or decentralized software architectures, and microservices are distinct from other types of component software modules and services. Each microservice of a microservices application performs a very finely grained operation that is extremely narrow in scope. Microservices comprised by a single microservices application may reside on different platforms or computing environments under the control of different third-party service providers, and are only loosely coupled to each other through lightweight communications mechanisms or pipelines. Rather than being implemented as a single monolithic application, a microservices application 400 may thus be implemented as a managed collection of independent, highly granular services that together deliver the functionality of an equivalent monolithic application.

Although other types of software-architecture strategies, such as a non-microservices service-oriented architecture (SOA), may share some structural characteristics with microservices architectures, those other types of design strategies do not split functionality among independently running components or services that have the high degree of granularity and narrow scope typical of a microservice.

In embodiments of the present invention shown in FIG. 4, each cloud-computing environment 415*a*-415*e*, or each cloud microservice 410*a*-410*e*, comprises an agent or other mechanism that monitors characteristics of the quality of service (QoS) provided by each hosted cloud microservice 410*a*-410*e* in its respective environment 415*a*-415*e*. In some embodiments, these mechanisms are conventional performance-monitoring, error-logging, or cost-accounting functions that track, for example, resource utilization, output quality, response time, or other parameters of interest.

The present invention is flexible enough to track any QoS characteristic desired by an implementer. For example, if a cloud microservice 410*a*-410*e* provides a communications function that streams digital-audio data between two devices, an embodiment might QoS characteristics that include average throughput, average latency, the duration of time required to begin streaming, or a frequency of lost packets. In another example, if a cloud microservice 410*a*-410*e* translates an SQL (Structured Query Language) database query into a database-specific data-access plan, QoS characteristics of that service could include the average number of data accesses performed by each generated data-access plan, the microservice's average response time, or a total resource cost incurred by execution of each generated data-access plan.

Each service provider records its monitored QoS or cost characteristics in a blockchain structure 420 that is accessible to each participating cloud service provider and to a cognitive service-provider selector module 425. Storage of data describing characteristics of a particular service provider's delivered QoS occurs under the control of that provider but, as with all blockchain applications, data stored on the blockchain 420 cannot be deleted or altered at a later time by any party.

In embodiments described here, it is possible for more than one cloud servicer provider to offer a desired cloud microservice 410*a*-410*e*. Each of these candidate providers may delivery the desired service at a different cost or with a different quality of service. Selector module 425 uses cognitive analytics or other methods of artificial intelligence to derive inferences from the blockchain data that identify an optimal cloud service provider that is most likely to deliver a requested microservice 410*a*-410*e* at a lowest cost or with optimal quality.

In some embodiments, drawing such inferences may require selector 425 to also consider extrinsic or contextual data, optionally stored in one or more data repositories 430 or retrieved from an external source. For example, data stored in one or more data repositories 430 may suggest that a particular service provider's structured billing plan makes that provider a more expensive option at certain times of the day.

Although FIG. 4 shows this extrinsic or contextual data being stored in a distinct data repository 430, some embodiments may store all or part of this data in the blockchain 420 or in a different blockchain. The choice of storage mechanism for each type of logged data may be made by an implementer for cost, technical, or logistical reasons, but in all cases, the primary blockchain 420 must store all critical data describing QoS characteristics that an implementer wishes to protect from unauthorized alteration by a cloud service provider, a microservices provider, or any other party.

In some embodiments, a characteristic of all or part of the extrinsic or contextual data, or a characteristic of a source of all or part of the extrinsic or contextual data, may render storage of the extrinsic or contextual data in the blockchain 420 to be unwieldy, burdensome, or otherwise undesirable. In one example, a correlation might exist between the reliability of a cloud service provider's microservice delivery and weather conditions at the provider's primary server farm. This could lead selector 425 to consider current weather forecasts when determining whether to select that provider. Because weather information is freely available from a variety of public sources, an implementer might decide that there is no need to waste blockchain resources to store such data, and would instead retrieve weather information from an extrinsic weather-service feed on-the-fly when selecting a service provider. The retrieved weather data might then be stored in an extrinsic data repository 430, where it could be accessed later to, for example, determine how closely the provider's performance correlates with weather conditions. These correlations would then help train the self-learning selector 425 to more accurately select service providers.

Figure 5:
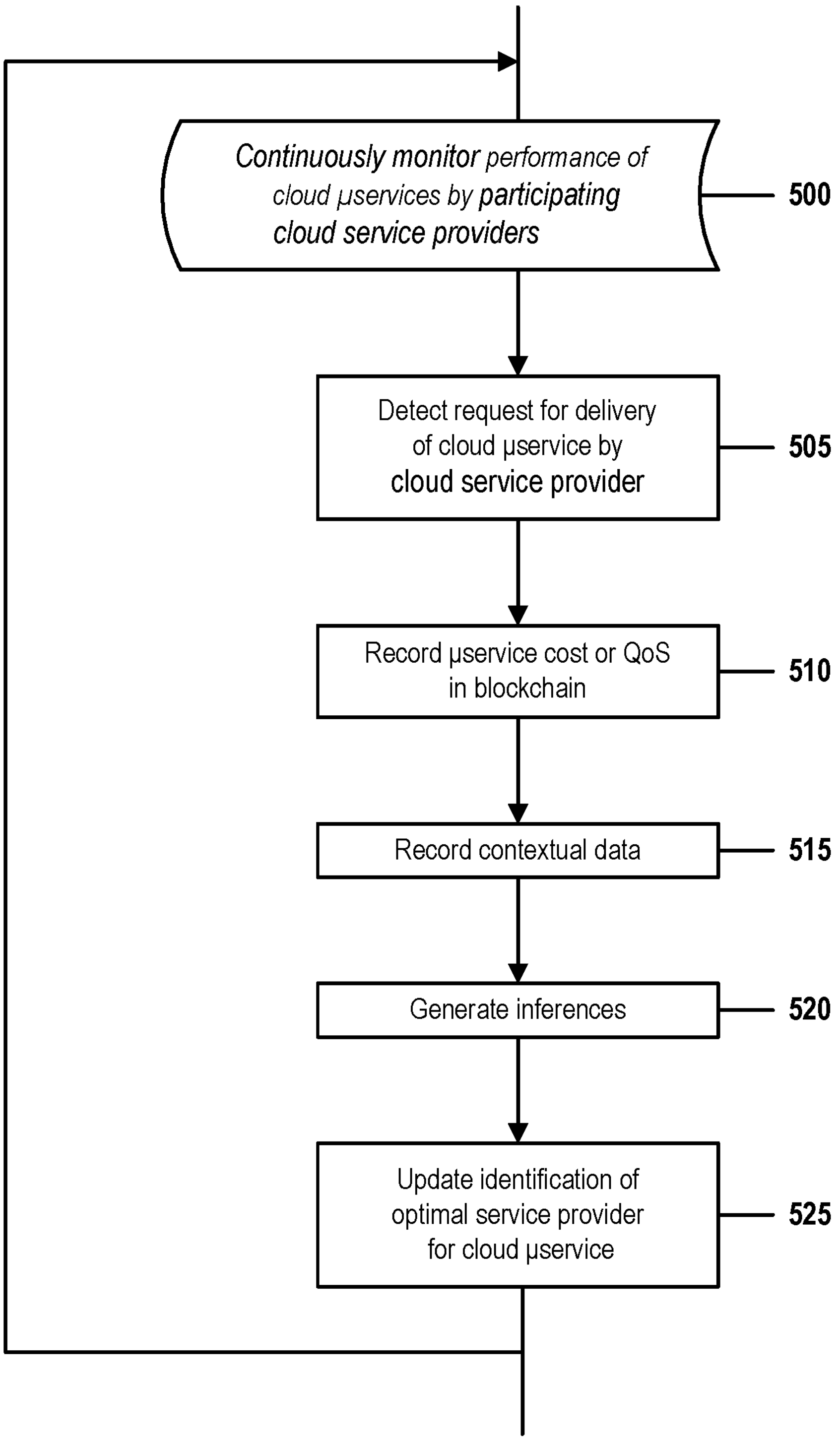
FIG. 5 is a flow chart that illustrates steps for generating blockchain records of microservice delivery by a cloud service provider in accordance with a first set of embodiments of the present invention.

FIG. 5 is a flow chart that illustrates steps for generating blockchain records of microservice delivery by a cloud service provider in accordance with a first set of embodiments of the present invention. FIG. 5 contains steps 500-525.

Step 500 initiates a continuously iterating procedure of steps 500-525. This procedure is performed by each participating cloud-service provider that provides a cloud-based microservice 410*a*-410*e* required by microservices application 400.

In step 505, an agent or other monitoring mechanism detects a request for delivery of a cloud-based microservice 410*a*-410*e* from one of the participating cloud-service providers. The request may be detected by any means known in the art, such as through a communications or logging function of a cloud-management stack of a cloud-computing environment that hosts the requested microservice 410*a*-410*e*, through a cloud service called by microservice 410*a*-410*e*, or through an internal component of microservice 410*a*-410*e*. The request may be received from microservices application 400 or from another application or system that requires delivery of the requested microservice 410*a*-410*e*.

In step 510, the agent, or other monitoring mechanism under control of the participating cloud service provider, stores data describing characteristics of the cost or QoS of the participating provider's delivery of the requested microservice 410*a*-410*e*. This data is stored in the blockchain 420 in a manner that prevents subsequent revision or deletion of the stored data.

In optional step 515, the agent or other monitoring mechanism stores extrinsic or contextual information that may be subject to correlation with the service provider's cost or QoS when delivering the requested microservice 410*a*-410*e*. This extrinsic or contextual information may comprise any sort of information deemed by an implementer to be relevant to predictions of the participating provider's ability to provide cost-effective or high-quality service.

An implementer may choose to require specific service providers to store certain types of extrinsic or contextual information in the blockchain 420, in a different blockchain data structure, or in a non-blockchain data repository 430, such as a relational database or a machine-learning corpus used to train self-learning applications. In some embodiments, a service provider may be allowed to determine where to store specific types of extrinsic or contextual information.

In step 520, cognitive service-provider selector module 425 uses cognitive analytics or another method of artificial intelligence to analyze the information stored in steps 510 and 515. This analysis may be performed according to rules or axioms stored in a knowledgebase or other knowledge repository. As is known in the field of artificial intelligence, cognitive module 425 uses these stored rules or axioms to draw inferences from the stored information and to use those inferences to make predictions. In this case, selector module 425 draws inferences about the participating service provider's likelihood of delivering the requested microservice 410*a*-410*e* at a certain cost or with a certain level of service quality; and uses these inferences to predict a likely cost or QoS of the participating service provider's future deliveries of the same microservice 410*a*-410*e*.

In step 525, cognitive service-provider selector module 425 updates, as a function of inferences generated in step 520, its selection of an optimal service provider for the requested microservice 410*a*-410*e*. This selection may be further based on data stored in previous iterations of steps 510 and 515 by any participating service provider that delivers the same requested microservice 410*a*-410*e*.

The selection may include a requirement that certain conditions exist at the time that a microservice is requested, such as a certain cloud workload, a current time of day or day of the week that falls within a certain billing category, a particular state of a network environment, a communications path through a particular network topology, or a degree of availability of a specific resource.

The procedure of steps 500-525 repeats each time that a request is made to a participating cloud-service provider to deliver microservice 410*a*-410*e*. During each iteration of this procedure, additional QoS, cost, contextual, or extrinsic data is captured or stored, and selector module 425 uses this information, in conjunction with previously captured or stored data, to dynamically update its identification of an optimal provider of the requested microservice 410*a*-410*e*. In this way, embodiments of the present invention continuously self-learn how to more accurately select optimal service providers.

In some embodiments, step 525 may be performed after the completion of multiple iterations of a shortened iterative procedure of steps 500-520. This alternative mechanism would allow optimal service providers to be concurrently identified for multiple microservices, using inferences derived for providers of all microservices. These embodiments provide an additional benefit of accounting for interdependencies and linkages among multiple microservices and among providers of the multiple microservices. For example, these embodiments would be better situated to determine whether selecting an optimal provider of one microservice required by the application changes the cost-effectiveness of that provider when providing other required microservices. In such cases, step 525 would identify an optimal combination of microservice providers, rather than identifying an optimal provider for a single microservice.

Figure 6:
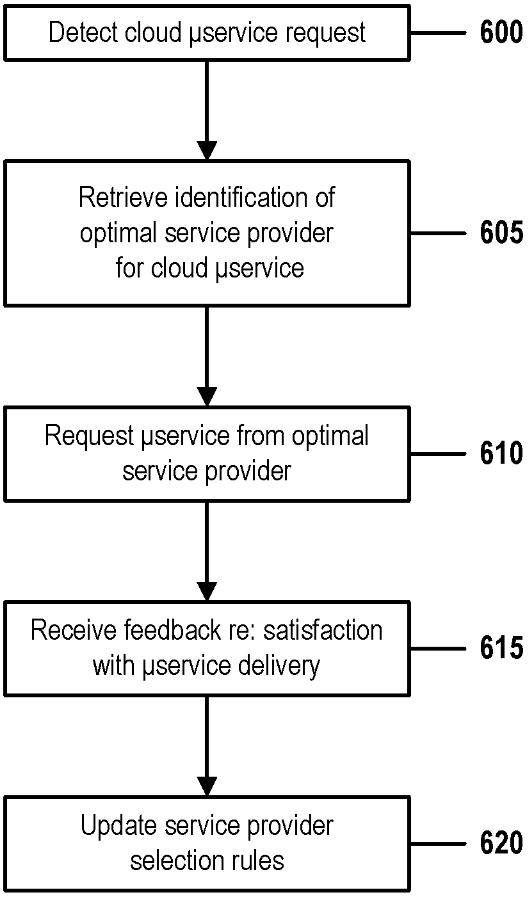
FIG. 6 is a flow chart that illustrates steps of a method for QoS-optimized selection of cloud microservices providers in accordance with the first set of embodiments of the present invention.

FIG. 6 is a flow chart that illustrates steps of a method for QoS-optimized selection of cloud microservices providers in accordance with the first set of embodiments of the present invention. FIG. 6 contains steps 600-620.

In step 600, cognitive service-provider selector 425 or another monitoring mechanism intercepts a request, by microservices application 400, for delivery of a cloud-based microservice 410*a*-410*e*.

In step 605, cognitive service-provider selector 425, in response to the request detection of step 600, retrieves the previously stored identification of an optimal provider of the requested microservice 410*a*-410*e*. This identification may include conditional rules, or selector 425 may, by using known methods of artificial intelligence or cognitive analytics, infer its own additional rules, for selecting the optimal provider within the context of the request. For example, if the request is detected at a certain time of day, cognitive selector 425 may select an optimal provider based on differences in each candidate providers' billing rates that vary according to time of day.

In step 610, selector 425 forwards the intercepted request to the optimal provider selected in step 620, and allows the optimal provider to deliver the requested cloud microservice 410*a*-410*e*.

In optional step 615, selector 425, or a related software module comprised by the embodiment, receives feedback about the cost-effectiveness or service quality of the delivered service. This feedback may comprise objective measurements, such as error rates, bit rates, jitter, availability, average throughput, or response times, as well as subjective measurements like user-submitted satisfaction ratings.

In optional step 620, selector 425 or the related software module updates the rules by which selector 425 selects optimal service providers or may update its selection of an optimal service provider for the requested cloud microservice 410*a*-410*e*. This step may performed by a method similar to that of the final steps of FIG. 5.

In some embodiments, steps 615 and 620 are performed by a distinct machine-learning application that trains cognitive selector 425 to more accurately identify optimal cloud service providers for particular microservices 410*a*-410*e*, as a function of specific combinations of extrinsic conditions or contextual data.

Figure 7:
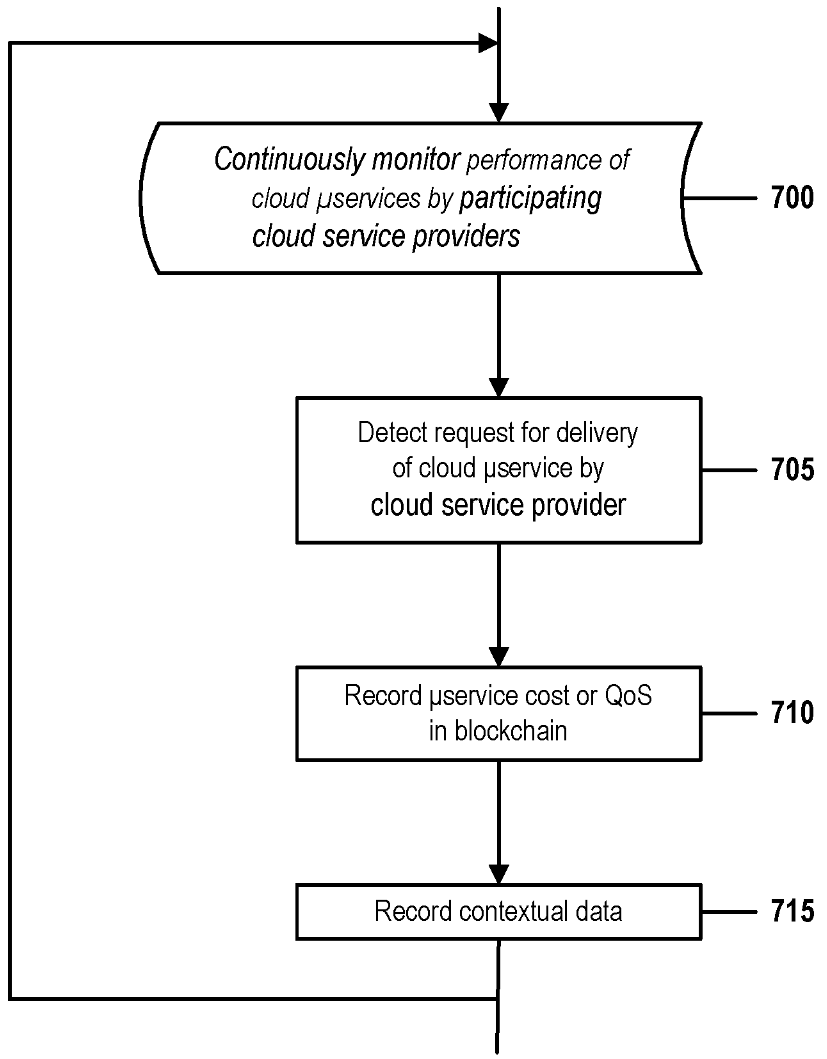
FIG. 7 is a flow chart that illustrates steps for generating blockchain records of microservice delivery by a cloud service provider in accordance with a second set of embodiments of the present invention.

FIG. 7 is a flow chart that illustrates steps for generating blockchain records of microservice delivery by a cloud service provider in accordance with a second set of embodiments of the present invention. FIG. 7 contains steps 700-715.

Step 700 initiates a continuously iterating procedure of steps 700-715. This procedure is performed by each participating cloud-service provider that provides a cloud-based microservice 410*a*-410*e* required by microservices application 400.

In step 705, an agent or other monitoring mechanism detects a request for delivery of a cloud-based microservice 410*a*-410*e* from one of the participating cloud-service providers. The request may be detected by any means known in the art, such as through a communications or logging function of a cloud-management stack of a cloud-computing environment that hosts the requested microservice 410*a*-410*e*, through a cloud service called by microservice 410*a*-410*e*, or through an internal component of microservice 410*a*-410*e*. The request may be received from microservices application 400 or from another application or system that requires delivery of the requested microservice 410*a*-410*e*.

In step 710, the agent, or other monitoring mechanism under control of the participating cloud service provider, stores data describing characteristics of the cost or QoS of the participating provider's delivery of the requested microservice 410*a*-410*e*. This data is stored in the blockchain 420 in a manner that prevents subsequent revision or deletion of the stored data.

In optional step 715, the agent or other monitoring mechanism stores extrinsic or contextual information that may be subject to correlation with the service provider's cost or QoS when delivering the requested microservice 410*a*-410*e*. This extrinsic or contextual information may comprise any sort of information deemed by an implementer to be relevant to predictions of the participating provider's ability to provide cost-effective or high-quality service.

An implementer may choose to require specific service providers to store certain types of extrinsic or contextual information in the blockchain 420, in a different blockchain data structure, or in a non-blockchain data repository 430, such as a relational database or a machine-learning corpus used to train self-learning applications. In some embodiments, a service provider may be allowed to determine where to store specific types of extrinsic or contextual information.

Figure 8:
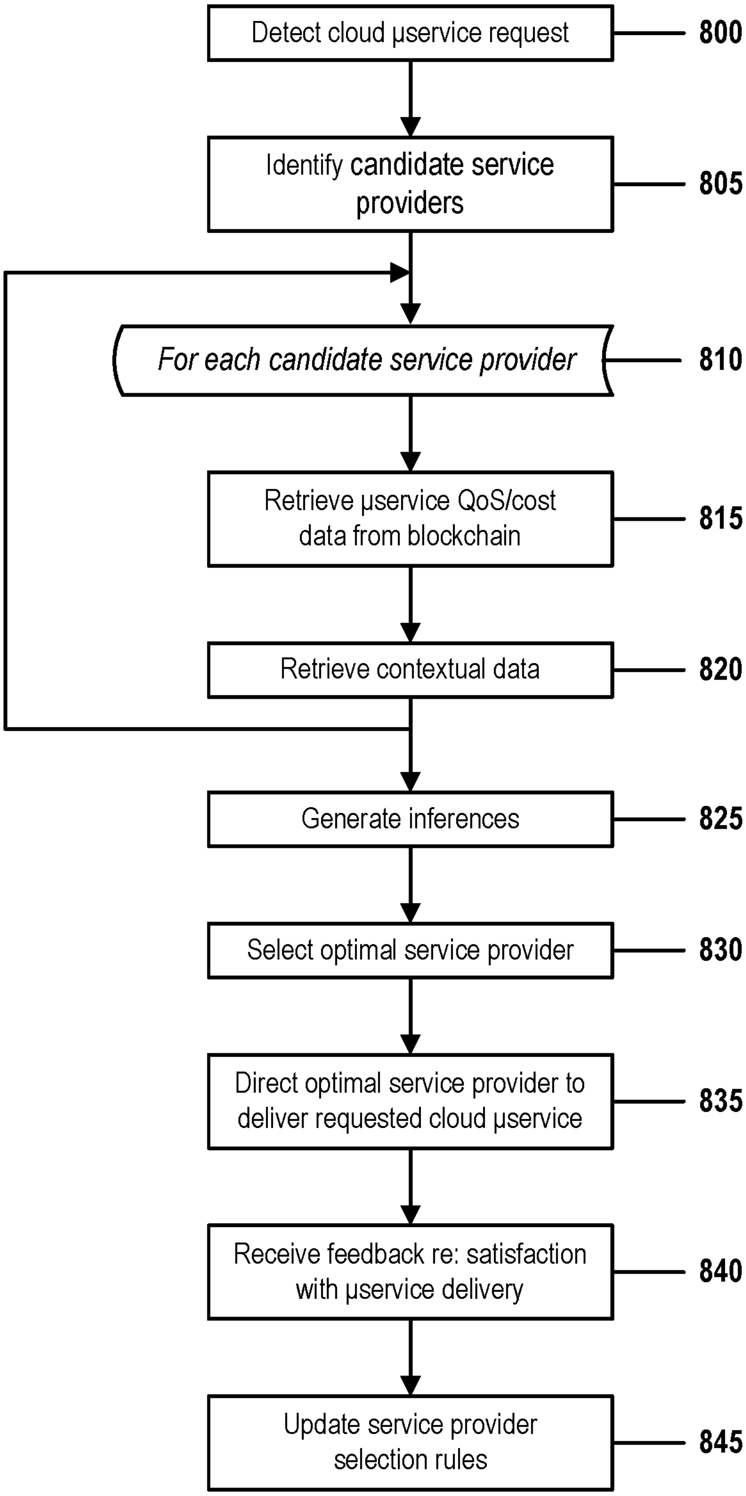
FIG. 8 is a flow chart that illustrates steps of a method for QoS-optimized selection of cloud microservices providers in accordance with the second set of embodiments of the present invention.

The stored data may be retrieved by embodiments of the present invention, such as by a cognitive or artificially intelligent cloud service-provider selector module 425, with the method of FIG. 8.

FIG. 8 is a flow chart that illustrates steps of a method for QoS-optimized selection of cloud microservices providers in accordance with the second set of embodiments of the present invention. FIG. 8 contains steps 800-845.

In step 800, cognitive service-provider selector 425 or another monitoring mechanism intercepts a request, by microservices application 400, for delivery of a cloud-based microservice 410*a*-410*e*.

In step 805, cognitive service-provider selector 425, in response to the request detection of step 800, identifies a set of candidate cloud service providers capable of delivering the requested cloud microservice 410*a*-410*e*. This identification may be performed by any means known in the art, such as by referring to a previously stored master registration list that enumerates the service providers who have chosen to participate, or by reading records of blockchain 420 that identify service providers that have previously delivered the requested microservice 410*a*-410*e*.

Step 810 initiates an iterative procedure of steps 810-820 that is performed once for each participating service provider identified in step 805.

In step 815, cognitive selector 425 retrieves information previously stored in blockchain 420 that identifies cost, QoS characteristics, or other relevant information about the participating service provider's previous deliveries of the requested microservice 410*a*-410*e*.

In optional step 820, cognitive selector 425 retrieves any other contextual or extrinsic information, previously stored by the participating service provider being evaluated by the current iteration of steps 810-820, and that relates to the current participating service provider's previous deliveries of the requested microservice 410*a*-410*e*.

In step 825, cognitive service-provider selector module 425 uses cognitive analytics or another method of artificial intelligence to analyze the information retrieved in steps 815 and 820. As in step 520 of FIG. 5, this step may be performed, according to rules or axioms stored in a knowledgebase or other knowledge repository, to draw inferences from the stored information and to use those inferences to predict which service provider, of the providers identified in step 805, is most likely to deliver the requested microservice 410*a*-410*e* most cost-effectively or with a most desirable set of QoS characteristics.

In step 830, cognitive service-provider selector module 425 uses the inferences and predictions derived in step 825 to select, from the set of candidate providers identified in step 805, an optimal cloud service provider deemed to be most likely to deliver the requested microservice with optimal results that satisfy requirements specified in step 825. This selection may be based at least in part on inferences that certain providers are more or less likely to be the optimal provider only when certain correlated conditions exist.

In step 835, cognitive service-provider selector module 425 transmits a request to, or otherwise directs, the optimal service provider to deliver the requested microservice 410*a*-410*e* to microservice application 400.

In optional step 840, selector 425, or a related software module comprised by the embodiment, receives feedback about the cost-effectiveness or service quality of the delivered service. This feedback may comprise objective measurements, such as error rates, bit rates, jitter, availability, average throughput, or response times, as well as subjective measurements like user-submitted satisfaction ratings.

In optional step 845, selector 425 or the related software module updates the rules by which selector 425 selects optimal service providers. This step may performed by any method known in the fields of machine learning, cognitive analytics, and related fields.

In some embodiments, steps 840 and 845 are performed by a distinct machine-learning application that trains cognitive selector 425 to more accurately identify optimal cloud service providers for particular microservices 410*a*-410*e*, as a function of specific combinations of extrinsic conditions or contextual data.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A microservices-management system comprising a processor, a memory coupled to the processor, and a computer-readable hardware storage device coupled to the processor, the storage device containing program code configured to be run by the processor via the memory to implement a method for selection of cloud microservices providers, the method comprising:

the processor intercepting a request, from a microservices application, for delivery of a cloud microservice, where the microservices application comprises a plurality of loosely coupled internal microservices, structured into a microservices architecture, that each perform a single operation and that communicate with each other through service-agnostic, lightweight protocols, where the plurality of internal microservices comprise the cloud microservice requested by the microservices application, where the cloud microservice requested by the microservices application is implemented by software residing on a cloud platform, where two or more instances of the cloud microservice are available to the microservices application, and where each instance of the two or more instances is hosted by a distinct cloud service provider of a set of candidate cloud-service providers;

the processor retrieving log data from a blockchain data structure, where the log data describes a characteristic of previous deliveries of the cloud microservice by the set of candidate cloud-service providers;

the processor identifying, as a function of an inference derived from the retrieved log data, one provider of the set of candidate cloud-service providers as being an optimal provider of the cloud microservice, where the one provider is not known to be in a trusted relationship with an owner of the microservices application that receives delivery of the cloud microservice from the one provider; and the processor forwarding the request to the optimal provider.

2. The system of claim 1, where the characteristic is a cost to deliver the microservice, and where the identifying predicts that the optimal provider will deliver the microservice at a lower cost than would any other provider of the set of candidate cloud-service providers.

3. The system of claim 1, where the characteristic is a characteristic of a quality-of-service of a delivery of the microservice, and where the identifying predicts that the optimal provider will deliver the microservice with a higher quality-of-service than would any other provider of the set of candidate cloud-service providers.

4. The system of claim 1, where the identifying is a further function of contextual data that describes an extrinsic condition, and where the inference correlates the extrinsic condition with a value, of the characteristic, associated with a previous delivery of the cloud microservice.

5. The system of claim 1, where the processor derives the inference by applying artificially intelligent cognitive analytics to the retrieved log data.

6. The system of claim 1, further comprising:

the processor receiving feedback about a responsive delivery of the cloud microservice, where the responsive delivery is performed by the optimal provider in response to the forwarded request, and where the feedback associates a true value of the characteristic with the responsive delivery;

the processor comparing the true value with a predicted value of the characteristic derived from the inference; and the processor, as a result of the comparing, learning to more accurately identify optimal providers of the cloud microservice.

7. The system of claim 1, where a first element of the log data was stored in the blockchain data structure by a first service provider of the set of candidate cloud-service providers, where the first element describes a first value of the characteristic, and where the first value characterizes a prior delivery of the cloud microservice by the first service provider.

8. The system of claim 4, where the contextual data is stored in a data repository that is distinct from the blockchain data structure.

9. A method for QoS-optimized selection of cloud microservices providers, the method comprising:

the processor intercepting a request, from a microservices application, for delivery of a cloud microservice, where the microservices application comprises a plurality of loosely coupled internal microservices, structured into a microservices architecture, that each perform a single operation and that communicate with each other through service-agnostic, lightweight protocols, where the plurality of internal microservices comprise the cloud microservice requested by the microservices application, where the cloud microservice requested by the microservices application is implemented by software residing on a cloud platform, where two or more instances of the cloud microservice are available to the microservices application, and where each instance of the two or more instances is hosted by a distinct cloud service provider of a set of candidate cloud-service providers;

the processor retrieving log data from a blockchain data structure, where the log data describes a characteristic of previous deliveries of the cloud microservice by the set of candidate cloud-service providers;

the processor identifying, as a function of an inference derived from the retrieved log data, one provider of the set of candidate cloud-service providers as being an optimal provider of the cloud microservice, where the one provider is not known to be in a trusted relationship with an owner of the microservices application that receives delivery of the cloud microservice from the one provider; and the processor forwarding the request to the optimal provider.

10. The method of claim 9, where the characteristic is a cost to deliver the microservice, and where the identifying predicts that the optimal provider will deliver the microservice at a lower cost than would any other provider of the set of candidate cloud-service providers.

11. The method of claim 9, where the characteristic is a characteristic of a quality-of-service of a delivery of the microservice, and where the identifying predicts that the optimal provider will deliver the microservice with a higher quality-of-service than would any other provider of the set of candidate cloud-service providers.

12. The method of claim 9, where the identifying is a further function of contextual data that describes an extrinsic condition, and where the inference correlates the extrinsic condition with a value, of the characteristic, associated with a previous delivery of the cloud microservice.

13. The method of claim 9, further comprising:

the processor receiving feedback about a responsive delivery of the cloud microservice, where the responsive delivery is performed by the optimal provider in response to the forwarded request, and where the feedback associates a true value of the characteristic with the responsive delivery;

the processor comparing the true value with a predicted value of the characteristic derived from the inference; and the processor, as a result of the comparing, learning to more accurately identify optimal providers of the cloud microservice.

14. The method of claim 9, where a first element of the log data was stored in the blockchain data structure by a first service provider of the set of candidate cloud-service providers, where the first element describes a first value of the characteristic, and where the first value characterizes a prior delivery of the cloud microservice by the first service provider.

15. The method of claim 9, further comprising providing at least one support service for at least one of creating, integrating, hosting, maintaining, and deploying computer-readable program code in the computer system, wherein the computer-readable program code in combination with the computer system is configured to implement the intercepting, the retrieving, the identifying, and the forwarding.

16. A computer program product, comprising a computer-readable hardware storage device having a computer-readable program code stored therein, the program code configured to be executed by a microservices-management system comprising a processor, a memory coupled to the processor, and a computer-readable hardware storage device coupled to the processor, the storage device containing program code configured to be run by the processor via the memory to implement a method for QoS-optimized selection of cloud microservices providers, the method comprising:

the processor intercepting a request, from a microservices application, for delivery of a cloud microservice, where the microservices application comprises a plurality of loosely coupled internal microservices, structured into a microservices architecture, that each perform a single operation and that communicate with each other through service-agnostic, lightweight protocols, where the plurality of internal microservices comprise the cloud microservice requested by the microservices application, where the cloud microservice requested by the microservices application is implemented by software residing on a cloud platform, where two or more instances of the cloud microservice are available to the microservices application, and where each instance of the two or more instances is hosted by a distinct cloud service provider of a set of candidate cloud-service providers;

the processor retrieving log data from a blockchain data structure, where the log data describes a characteristic of previous deliveries of the cloud microservice by the set of candidate cloud-service providers;

the processor identifying, as a function of an inference derived from the retrieved log data, one provider of the set of candidate cloud-service providers as being an optimal provider of the cloud microservice, where the one provider is not known to be in a trusted relationship with an owner of the microservices application that receives delivery of the cloud microservice from the one provider; and the processor forwarding the request to the optimal provider.

17. The computer program product of claim 16, where the characteristic is a cost to deliver the microservice, and where the identifying predicts that the optimal provider will deliver the microservice at a lower cost than would any other provider of the set of candidate cloud-service providers.

18. The computer program product of claim 16, where the characteristic is a characteristic of a quality-of-service of a delivery of the microservice, and where the identifying predicts that the optimal provider will deliver the microservice with a higher quality-of-service than would any other provider of the set of candidate cloud-service providers.

19. The computer program product of claim 16, further comprising:

the processor receiving feedback about a responsive delivery of the cloud microservice, where the responsive delivery is performed by the optimal provider in response to the forwarded request, and where the feedback associates a true value of the characteristic with the responsive delivery;

the processor comparing the true value with a predicted value of the characteristic derived from the inference; and the processor, as a result of the comparing, learning to more accurately identify optimal providers of the cloud microservice.

20. The computer program product of claim 16, where a first element of the log data was stored in the blockchain data structure by a first service provider of the set of candidate cloud-service providers, where the first element describes a first value of the characteristic, and where the first value characterizes a prior delivery of the cloud microservice by the first service provider.

* * * * *